United States Patent [19]

Gardner et al.

[11] 4,134,259

[45] Jan. 16, 1979

[54] FUEL MANIFOLD PREFILL

[75] Inventors: William B. Gardner, West Simsbury; John Kniat, Glastonbury, both of Conn.

[73] Assignee: United Technologies Corporation, Hartford, Conn.

[21] Appl. No.: 799,013

[22] Filed: May 20, 1977

[51] Int. Cl.² .............................................. F02K 3/10
[52] U.S. Cl. .............................. 60/241; 60/39.28 R; 60/243
[58] Field of Search ................... 60/39.28 R, 241, 243, 60/261

[56] References Cited

U.S. PATENT DOCUMENTS 3,395,338  8/1968  Borel ..................................... 60/243
3,591,968  7/1971  Arnett .................................... 60/243
3,834,160  9/1974  Moehring .............................. 60/243

Primary Examiner—Clarence R. Gordon
Attorney, Agent, or Firm—Norman Friedland

[57] ABSTRACT

For improved thrust responsiveness and smooth transition of the various zones of an augmentor of an augmented jet engine powered aircraft, the time to prefill the fuel manifolds of the zones are calculated from preselected parameters so as to be on line upon light-off. The throttle lever signal is rate limited so that the preascertained manifold volume of each zone divided by the zone filling fuel flow produces a signal indicative of the time to open the normal fuel fill valve to prefill the manifold at the proper time and in the right sequence using a rate limited throttle lever signal.

4 Claims, 2 Drawing Figures

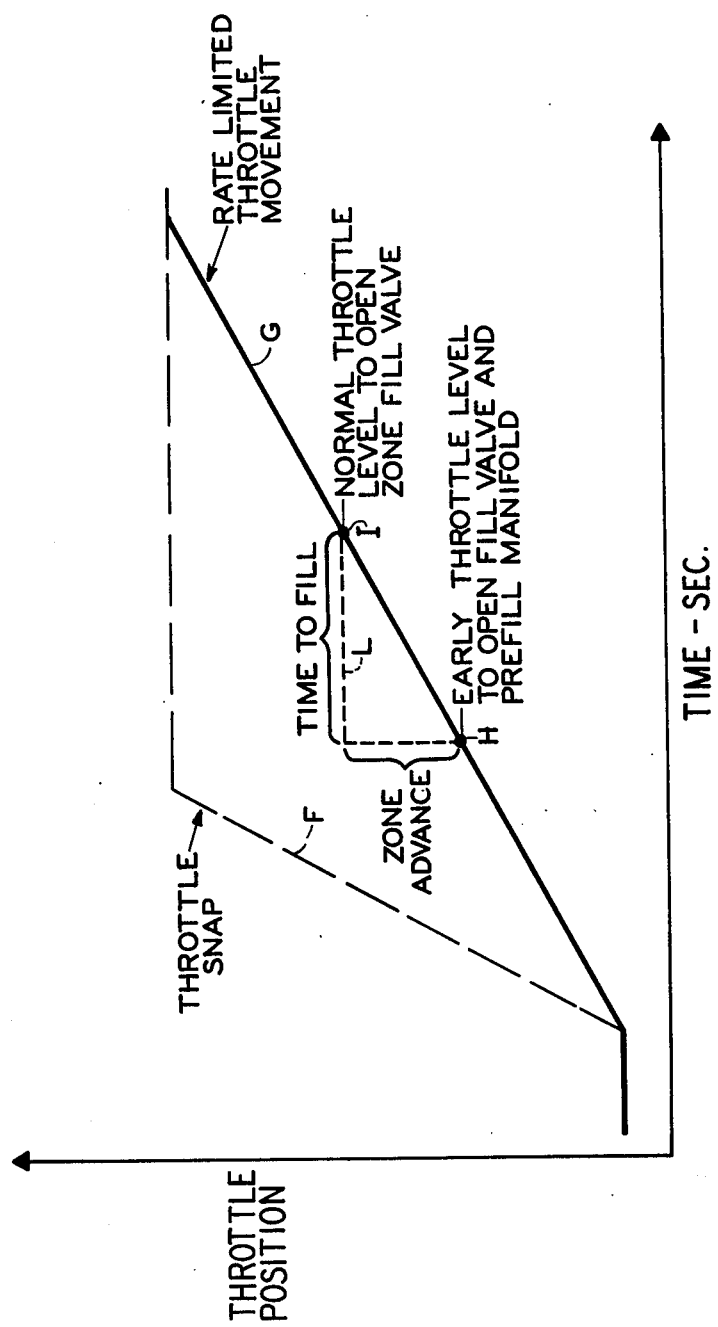

FUEL MANIFOLD PREFILL

BACKGROUND OF THE INVENTION

This invention relates to augmentors for jet type powered aircraft and particularly to means to prefill the manifold with fuel to the several combustion zones at a precalculated time prior to light-off.

As is well known in high powered advance aircraft that employ augmentors it is abundantly important to prefill the manifold of each zone in the augmentor with fuel prior to light-off for obtaining immediate thrust response and smooth transition. Several techniques are exemplified by U.S. Pat. Nos. 3,587,231 granted to G. A. Fisher and C. F. Stearns on June 28, 1971; 3,552,123 granted to D. E. Anschutz and K. L. Linebrink on Jan. 5, 1971; and 3,331,204 granted to P. L. Love on July 18, 1967 where prefill was accomplished by mechanical means and the manifolds were prefilled from a separate fuel source which had a flow rate higher than the metering valve. In these instances, for example, mechanism was employed to sequentially prefill and hold by some latching arrangement until the next previous zone was connected to the metering valve. While such arrangements may be satisfactory for some aircraft applications or may meet the flight envelope of certain missions they are not satisfactory for others.

Hence, in order to maximize response time from a pilot's command signal as manifested by the throttle lever position, we have found that using the regular fuel source and fill valve timed according to preselected conditions, it is possible to increase the time responsiveness and achieve smooth transitions from one zone to the other. By knowing the volume of the manifold and the zone requested rate of fuel flow under the circumstances of limiting the rate of throttle lever signal to a predetermined rate of change, it is possible to calculate the time necessary to prefill the next subsequent combustion zone and hence the control would preopen the next zone fill valve so that the manifold would be filled when that zone is in the light-off condition. The rate limited throttle lever signal provides constant command rate so that timing can be consistently achieved at all flight conditions. This invention contemplates varying fuel flow for a given engine operation over the flight envelope.

In a partial advancement of the throttle lever, the throttle lever position would automatically determine that less than the full number of combustion zones would be actuated. Hence, the prefill would only be signaled to the fill valves for those zones that will fulfill the thrust requirements dictated by throttle lever position.

SUMMARY OF THE INVENTION

An object of this invention is to provide improved means for prefilling the fuel manifolds of each zone of an augmentor of a gas turbine powered aircraft to improve calculating the "time to fill" so as to improve thrust responsiveness.

A still further object of this invention is to calculate the time to fill the manifolds of each zone of a multizone augmentor by rate limiting the throttle lever position signal and calculate the fuel flow and compare it to the volume of the manifold so as to open the fill valve within the time increment preceding light-off.

Other features and advantages will be apparent from the specification and claims from the accompanying drawings which illustrate an embodiment of the invention.

BRIEF DESCRIPTION OF THE DRAWINGS

FIG. 2 is a graphical illustration showing the position of the throttle plotted against time where the throttle movement is rate limited.

DESCRIPTION OF THE PREFERRED EMBODIMENT

Figure 1:
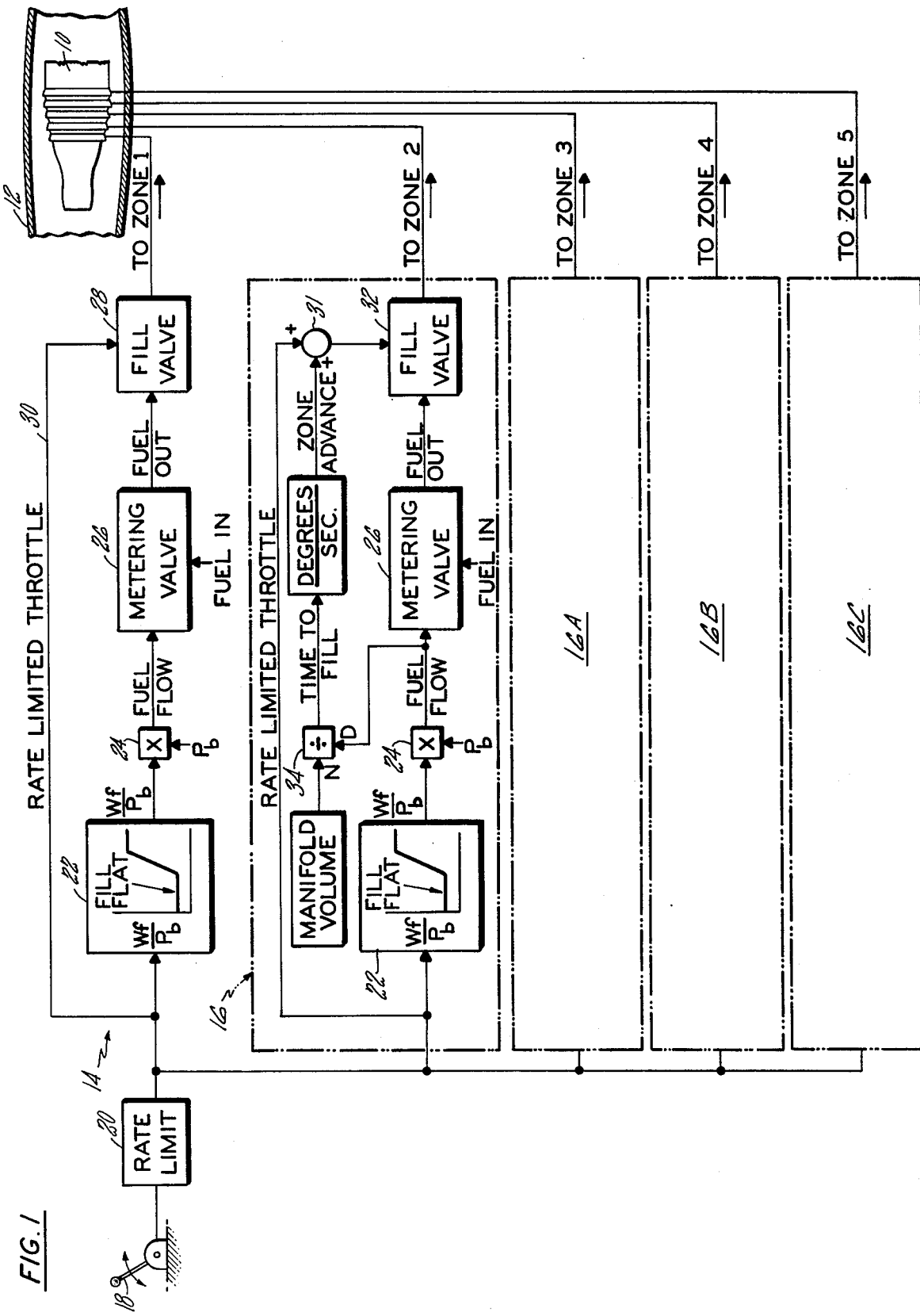
FIG. 1 is a block diagram schematically illustrating the present invention.

For the sake of convenience and clarity the details of the fuel control and augmented jet engine are omitted herefrom but for further details reference should be made to the TF-30 engine with afterburner manufactured by the Pratt & Whitney Division of United Technologies Corporation and the JFC-60 fuel control manufactured by the Hamilton Standard Division of United Technologies Corporation, the assignee herein or the AJ-H1, CJ-G5, CJ-G7 or CJ-G8 manufactured by the Bendix Energy Control Division of the Bendix Corporation. Also U.S. Pat. No. 3,552,123, supra, is incorporated herein by reference.

As shown in FIG. 1 the control for supplying fuel for the five zones in the combustor 10 of augmentor 12 is represented by the five subcontrols generally illustrated by reference numerals 14, 16, 16A, 16B, and 16C. The reference letters A, B, and C are so designated because they represent subsystems that are identical to subsystem 16.

Fuel flow to the five zones is initiated by positioning throttle lever 18 and its position from closed to full open will determine the number of zones that will be actuated.

Obviously, zone 1 will be the most forward position of throttle 18 and will be actuated first and zone 5 will be the most rearward position of throttle 18 and will be actuated last. The other zones in the ascending sequence will be actuated intermediate these two positions. Hence, a partial movement of throttle 18 will actuate less than the 5 zones.

According to this invention the movement of throttle 18 is rate limited by any well known limiting device represented by rate limit box 20. This signal is applied as an input to the function generator 22 which produces a value indicative of $W_f/P_b$, where $W_f$ is fuel flow in pounds per hour and $P_b$ is burner pressure in pounds per square inch. As one skilled in the art will appreciate other pressures of the engine air flow may be utilized, such as compressor inlet or discharge pressure, without deviating from the scope of this invention. The output from function generator 22 is multiplied by an actual $P_b$ signal in multiplier 24 resulting in a desired or scheduled fuel flow value. This signal in turn, is applied to the fuel metering value 26, which may be similar to valve 82 of U.S. Pat. No. 3,552,123, for metering the proper amount of fuel to zone 1. Fill valve 28 is interposed between zone 1 and metering valve 26 and remains closed until signaled open via the rate limit throttle signal via line 30. The time necessitating opening fill valve 28 is practically instantaneous upon the initial positioning of throttle lever 18.

However, if the position of throttle 18 is beyond the point where more than one zone is called for the manifolds in zones 2, 3, 4 and 5 will be prefilled in accordance with the description immediately following. As noted in FIG. 2, the movement of the throttle, say from off to full open is dependent on the operator. In instances where such movement is almost instantaneous represented by the dash line F, the position from closed to open is relatively fast. This signal is rate limited as represented by the line G. As can be seen by subsystem 16 a zone advance signal is added to the rate signal at junction 31 which opens fill valve 32 prior to the time it would occur if allowed its normal point in time to open. The early open time is represented by point H and the normal time is represented by point I. Hence, the distance represented by the dash line L under the "time to fill" lable is the time in seconds necessary to open fill valve 32 early to prefill the manifold of zone 2 prior to light-off.

The "time to fill" is obtained by dividing in a suitable divider 34 the volume of the manifold of zone 2 by the fuel flow signal manifested by multiplier 24. (Similar reference numerals designate identical elements). The remaining zones are actuated identically but in ascending sequence, assuring that the manifold of each subsequent zone is prefilled prior to being lighted-off.

As one skilled in the art will appreciate this concept lends itself to being implemented by digital computers and in advanced engine technology where digital controls are already utilized the system would readily lend itself to be implemented.

It should be understood that the invention is not limited to the particular embodiments shown and described herein, but that various changes and modifications may be made without departing from the spirit or scope of this novel concept as defined by the following claims.

We claim:

1. For a jet engine augmentor having a plurality of combustion zones and manifolds leading fuel to each of said combustion zones, a source of fuel and a fuel control having a fuel metering valve interconnecting each of said manifolds and said source of fuel, on-off valves disposed in fuel flow relation between said fuel metering valve and each of said manifolds, a pilot throttle lever, means responsive to the position of said pilot throttle lever capable of opening each of said on-off valves in ascending order upon a given time in anticipation of light-off in each of said combustion zones subsequent to the first one, said means including a rate limiter for limiting the signal emanating from movement of said throttle to a constant rate and means responsive to said constant rate for calculating the time to fill said manifold in the next ascending order to actuate said on-off valve in anticipation of light-off of that combustion zone whose manifold is being filled with fuel.

2. For a jet engine augmentor as in claim 1 wherein said calculating means includes the actual fuel flow delivered to the next adjacent zone to the one just lighted and the volume of its manifold.

3. For a jet engine augmentor as in claim 1 wherein said calculating means includes first means for generating a signal in response to power lever movement indicative of scheduled $W_f/P$, where $W_f$ is fuel flow in pounds per hour and $P$ is a pressure of the jet engine working medium, second signal indicative of the actual pressure of said engine working medium, a third signal indicative of the product of said first signal and said second signal, a fourth signal indicative of the dividend of said third signal and a value of the volume of the manifold of the zone next to be filled, and a summer for adding said constant rate to said fourth signal for opening said normally closed on-off valve.

4. For a jet engine augmentor as in claim 3 including a burner section wherein said pressure of said working medium is measured at said burner section.

* * * * *